United States Patent [19]

Prete et al.

[11] Patent Number: 5,546,295

[45] Date of Patent: Aug. 13, 1996

[54] ELECTRICAL POWER CONVERTER, POWER SUPPLY, AND INVERTER WITH SERIES-CONNECTED SWITCHING CIRCUITS

[75] Inventors: Ralph Prete, West Haven, Conn.; Vladimir Brunstein, New Milford, N.J.; Todd J. Kazmirski, Port Ewen, N.Y.

[73] Assignee: Rotron Incorporated, Woodstock, N.Y.

[21] Appl. No.: 520,302

[22] Filed: Aug. 28, 1995

Related U.S. Application Data

[63] Continuation of Ser. No. 201,002, Feb. 24, 1994, abandoned.

[51] Int. Cl.⁶ .................................................. H02M 3/335
[52] U.S. Cl. ................... 363/17; 363/71; 363/98
[58] Field of Search ...................... 363/17, 65, 71, 363/98, 132

[56] References Cited

U.S. PATENT DOCUMENTS

| | | | |
|---|---|---|---|
| 4,153,930 | 5/1979 | Marceau et al. | 363/42 |
| 4,316,243 | 2/1982 | Archer | 363/132 |
| 4,347,558 | 8/1982 | Kalinsky | 363/17 |
| 4,500,949 | 2/1985 | Prete | 363/28 |
| 4,564,895 | 1/1986 | Glennon | 363/41 |
| 4,733,104 | 3/1988 | Steigerwald et al. | 307/260 |
| 4,823,247 | 4/1989 | Tamoto | 363/16 |
| 4,823,249 | 4/1989 | Garcia, II | 363/48 |
| 4,833,584 | 5/1989 | Divan | 363/37 |
| 4,860,184 | 8/1989 | Tabisz et al. | 363/17 |
| 4,967,332 | 10/1990 | Claydon et al. | 363/17 |
| 5,010,261 | 4/1991 | Steigerwald | 307/571 |
| 5,038,267 | 8/1991 | DeDoncker et al. | 363/89 |
| 5,053,937 | 10/1991 | Blockl | 363/16 |
| 5,189,601 | 2/1993 | Sellers | 363/21 |
| 5,241,217 | 8/1993 | Severinsky | 307/64 |
| 5,245,520 | 9/1993 | Imbertson | 363/17 |

OTHER PUBLICATIONS

M. Miller et al., "High Frequency ZVS for High Power Rectifiers", Intelec–93 Conference, Sep. 27–30, 1993, Paris, France, 7 pages.

Primary Examiner—Peter S. Wong
Assistant Examiner—Y. Jessica Han
Attorney, Agent, or Firm—Brumbaugh, Graves, Donohue & Raymond

[57] ABSTRACT

Due to the intermittent nature of electrical connection through moving contacts on electrically propelled vehicles, electrical power converters such as power supplies and inverters are subject to large voltage transients. For compactness and low weight, a high-frequency power converter comprised series-connected high-speed switching circuits, so that an input voltage with voltage transients is split between the switching circuits. As a result, lower-rated switching elements such as IGBT's and MOSFET's can be used while maintaining resistance to input-voltage transients.

22 Claims, 4 Drawing Sheets

ELECTRICAL POWER CONVERTER, POWER SUPPLY, AND INVERTER WITH SERIES-CONNECTED SWITCHING CIRCUITS

This is a continuation application of U.S. patent application Ser. No. 08/201,002, filed Feb. 24, 1994, now abandoned.

BACKGROUND OF THE INVENTION

The invention relates to electrical converters, especially for use in power supplies in electrically propelled vehicles with external power pick-up, e.g., in electrical locomotives, streetcars, trolley buses, and subways.

Electrically propelled vehicles may require one or several auxiliary power supplies, e.g., for lighting, air conditioning, and communications. Typically, such power supplies run off a main DC line supplying power to the traction drive system of the vehicle. Electrical connection to the main power line is through a carbon brush to an overhead wire or a third rail; in the case of trolley buses, two carbon brushes to overhead power lines are used. As a result, due to the intermittent nature of connection through moving contacts, DC input power is subject to large voltage transients.

Auxiliary power requirements on the electric vehicle may be AC or/and DC, and often at several different voltage levels. For example, a vehicle may have a 37-volt DC low-voltage bus, a 370-volt DC high-voltage bus, and a 230-volt 3-phase AC bus. These line characteristics may be derived from three separate supply circuits or from a single hybrid circuit. In either case, power is extracted from the main power line at 600 volts DC, for example.

Known power supply circuit configurations of interest here have evolved into topologies which may be referred to as GTO-AC and GTO-DC type, for AC and DC output power, respectively. In a GTO-AC power supply, a GTO (gate turn on) switching network drives the primary side of a low frequency transformer, typically at 60 Hz. The secondaries of the transformer provide the desired AC power to a bus in the vehicle. In this design, the transformer turns ratio must be chosen to give the desired AC output voltage for the 600-volt DC nominal input. Any long-term transient will show up in the output of the secondary winding, so that the output voltage will be regulated only if the input voltage is regulated. Moreover, even at constant input voltage, the output voltage will vary somewhat with load current.

A GTO-DC power supply is similar, with a GTO switching network on the primary side of a transformer inducing a low-frequency AC output voltage at the output of the secondary winding(s). This voltage is then fed into a rectifier network to provide a DC source. Again, the output voltage varies with input voltage and with load current.

These topologies have gained acceptance because of their ruggedness and proven reliability. Transient voltages on the 600-volt line input can be in the range of 3000 to 5000 volts, and any equipment such as GTO's directly connected to this line must be able to survive the transients. Of course, a filter may be interposed for attenuating the large transients. Since the transients have a significant amount of energy, the filter must have large capacity. As a result, for a 15 kW power supply, for example, such a filter will weigh several hundred pounds. If a smaller filter is to be used, GTO's are required with correspondingly higher voltage ratings.

Although these power supplies have proved to be reliable in the field, they have significant drawbacks. One significant drawback lies in their size and weight. Since they operate at low frequency, all their energy conversion components, including the input filter chokes, input filter capacitors, transformer, output filter chokes and output filter capacitors are very large and bulky, typically having a weight upward of 2000 pounds and a volume on the order of 50 cubic feet.

Power supplies in which the supply frequency is higher have reduced weight and size, with smaller and lighter filter capacitors and switching transformers. Such power supplies require transistors which can switch at high frequencies. While GTO's can operate only up to 1 kHz, high-speed transistors such as insulated gate bipolar transistors (IGBT) and metal oxide semiconductor field effect transistors (MOSFET) can switch at frequencies up to at least 20 kHz; see, e.g., U.S. Pat. No. 4,860,184, issued Aug. 22, 1989 to W. A. Tabisz et al.

High-speed transistors are available only in voltage ratings up to 1200 volts, so that use of IGBT's or MOSFET's in vehicular applications again would seem to require a large input filter to attenuate the transient voltages on the traction power line. Such combinations of an input filter with a high frequency switching converter are not price competitive with low frequency GTO-type converters.

SUMMARY OF THE INVENTION

An electrical power converter such as an inverter or a DC power supply comprises series-connected switching circuits, so that a DC input voltage is split between the switching circuits. As a result, lower-rated, high-speed switching elements can be used without damage due to input-voltage transients. Among suitable switching elements are IGBT's and MOSFET's. The series-connected switching circuits are half-bridge circuits or full-bridge circuits. A circuit which is a half-bridge circuit or a full bridge circuit here will be designated as a bridge-topology switching converter circuit.

DETAILED DESCRIPTION OF PREFERRED EMBODIMENTS

Figure 1:
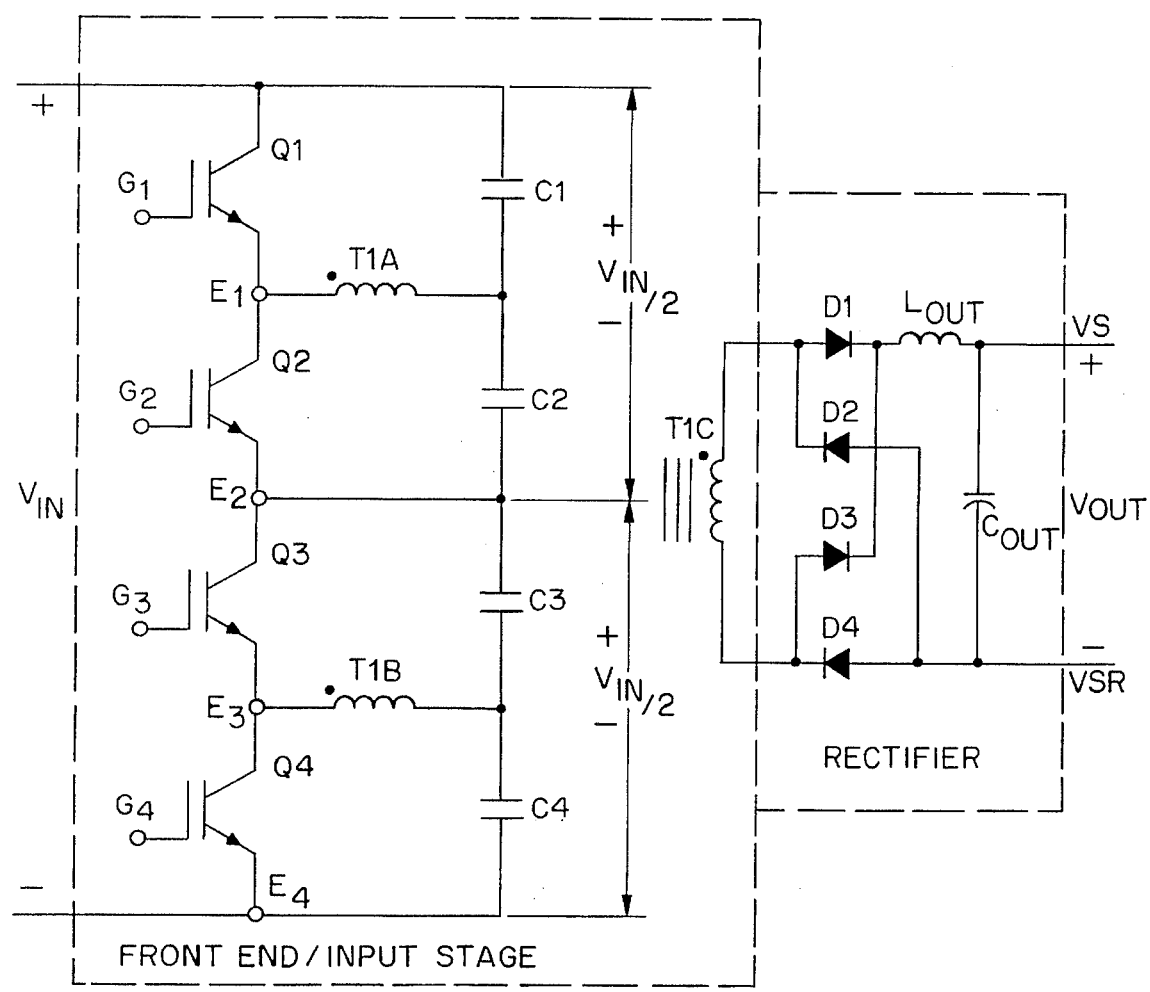
FIG. 1 is a circuit diagram of a preferred first embodiment of the invention, representing a DC power supply comprising half-bridge transistor circuits.

The DC power supply circuit of FIG. 1 includes a front-end or input stage with switching transistors Q1 through Q4 with respective gate terminals G1 through G4 and emitter terminals E1 through E4, and capacitors C1 through C4. Via a transformer with primary windings T1A and T1B, and with a secondary winding T1C, the input stage is coupled to a rectifier stage with diodes D1 through D4, a coil $L_{OUT}$ and a capacitor $C_{OUT}$. In operation, upon application of a DC input voltage $V_{IN}$, a DC output voltage $V_{OUT}$ is produced.

The following components are included in an exemplary embodiment of a DC power supply circuit in accordance with FIG. 1: transistors Q1 through Q4, Toshiba IGBT's MG200Q2YS1, rated at 200 A and 1200 V; capacitors C1 through C4, Philips 3188GH372T400AMA2, 3700 microfarad, rated 400 V; coupling transformer windings T1A and T1B with 18 turns each, and winding T1C with 3 turns; diodes D1 through D4, Sanrex FRS200AA60, rated at 200 A and 600 V; output inductance $L_{OUT}$ of 15 millihenry, output capacitor $C_{OUT}$ Philips 3188GG4730075AMA2, 47000 microfarad, rated at 75 V.

Figure 2:
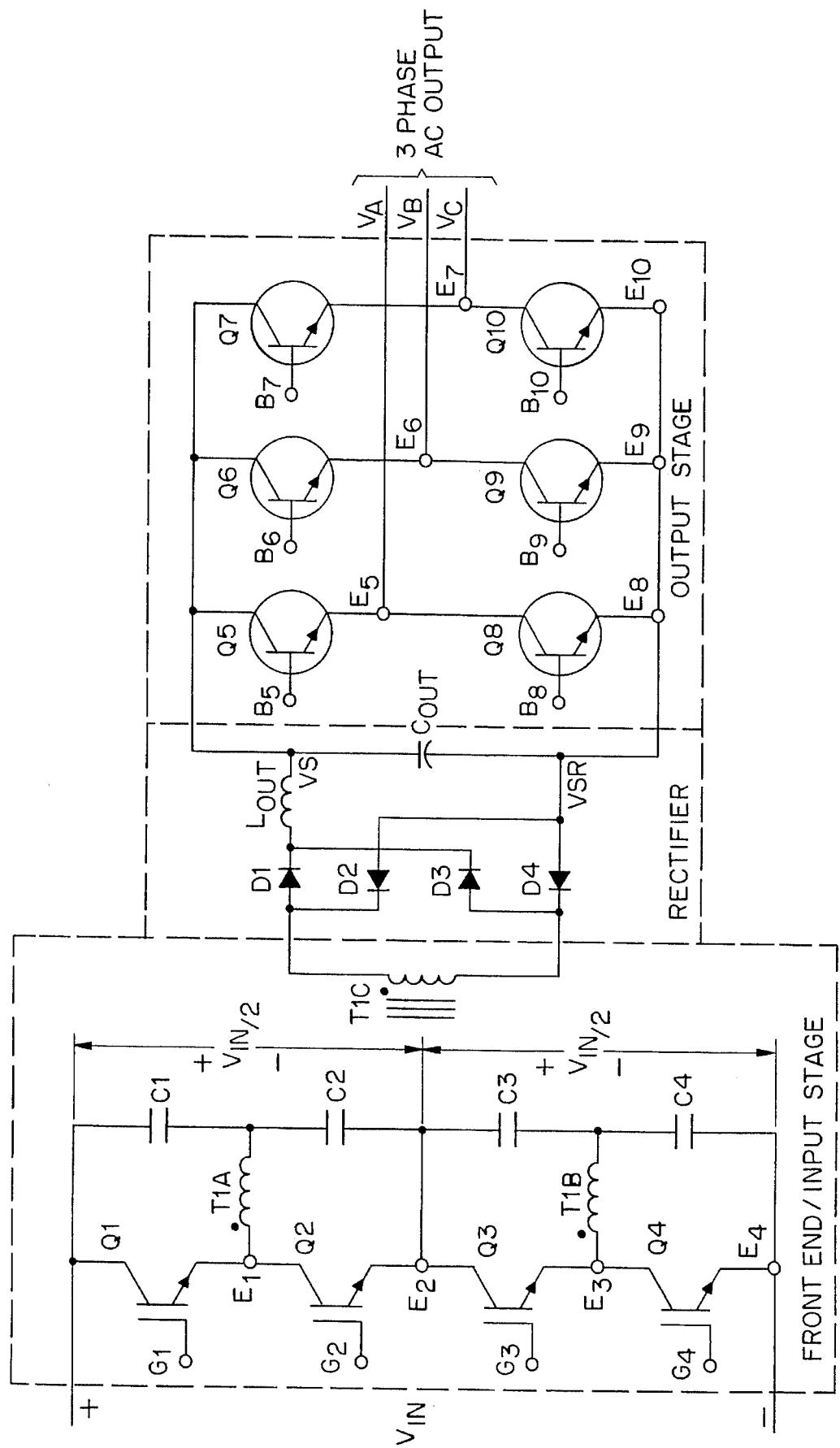
FIG. 2 is a circuit diagram of a preferred second embodiment of the invention, representing an inverter comprising half-bridge transistor circuits.

The inverter circuit of FIG. 2 comprises front-end and rectifier stages as described above with reference to FIG. 1, followed by an output stage with transistors Q5 through Q10 with respective base terminals B5 through B10 and emitter terminals E5 through E10. In operation, upon application of a DC input voltage $V_{IN}$, 3-phase AC output is produced.

The following components are included in an exemplary prototype embodiment of an inverter circuit in accordance with FIG. 2: transistors Q1 through Q4 and capacitors C1 through C4 as specified above for the exemplary embodiment of the power supply circuit in accordance with FIG. 1; coupling transformer windings T1A and T1B with 8 turns each, and winding T1C with 28 turns; diodes D1 through D4, Sanrex FDS100AA60, rated at 100 A and 600 V; output inductance $L_{OUT}$ of 2 millihenry, output capacitor $C_{OUT}$ Philips 3188GG322T400AM, 3200 microfarad, rated at 400 V; output stage transistors Q5–Q10, Powerex KD421215HD rated at 150 A and 1200 V. This prototype embodiment, including a front end with two IGBT half-bridge circuits in series, operates as a 15 kW 3-phase AC inverter at a switching frequency of 20 kHz.

Another prototype embodiment has two outputs. One output provides 28 volts DC for a low-voltage bus, and the other provides a voltage which varies between 172 volts and 320 volts, for charging a battery bank as a stand-by for emergency propulsion. The front end of this supply also uses a dual-stage IGBT-based half bridge operating at 20 kHz. Each of the prototypes weighs less than 200 pounds. It is estimated that GTO-type supplies with similar capability would weigh on the order of 1,000 pounds.

Figure 3:
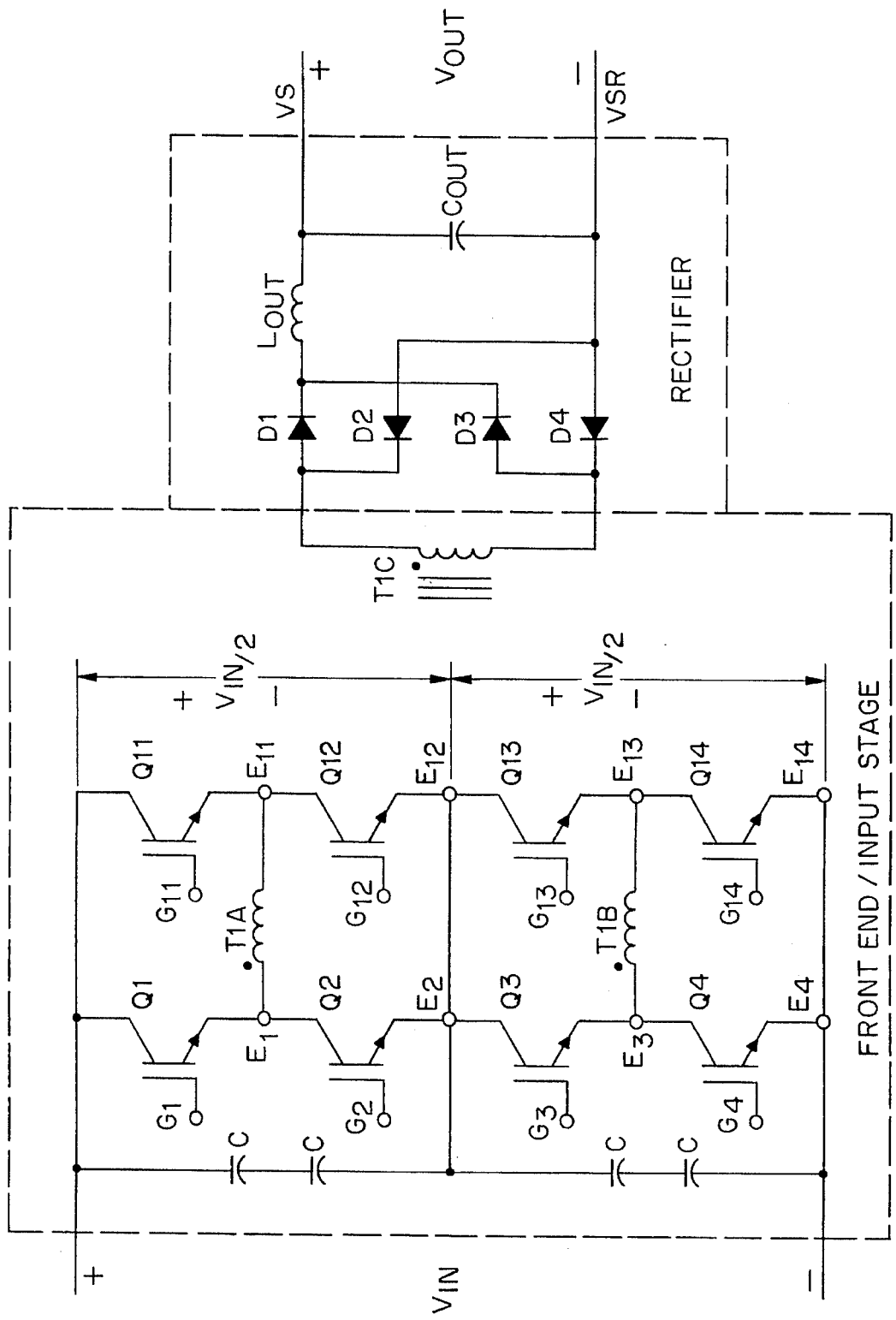
FIG. 3 is a circuit diagram of a preferred third embodiment of the invention, representing a DC power supply comprising full-bridge transistor circuits.

The DC power supply circuit of FIG. 3 includes a front-end or input stage with input capacitors C and with IGBT's Q1 through Q4 and Q11 through Q14, having respective gate terminals G1 through G4 and G11 through G14, and having respective emitter terminals E1 through E4 and E11 through E14. Via a coupling transformer with primary windings T1A and T1B, and with a secondary winding T1C, the input stage is coupled to a rectifier stage with diodes D1 through D4, a coil $L_{OUT}$ and a capacitor $C_{OUT}$. In operation, upon application of a DC input voltage $V_{IN}$, a DC output voltage $V_{OUT}$ is produced. Exemplary numerical values for the components shown in FIG. 3 are as described above for FIG. 1, with capacitors C of 3700 microfarad.

Figure 4:
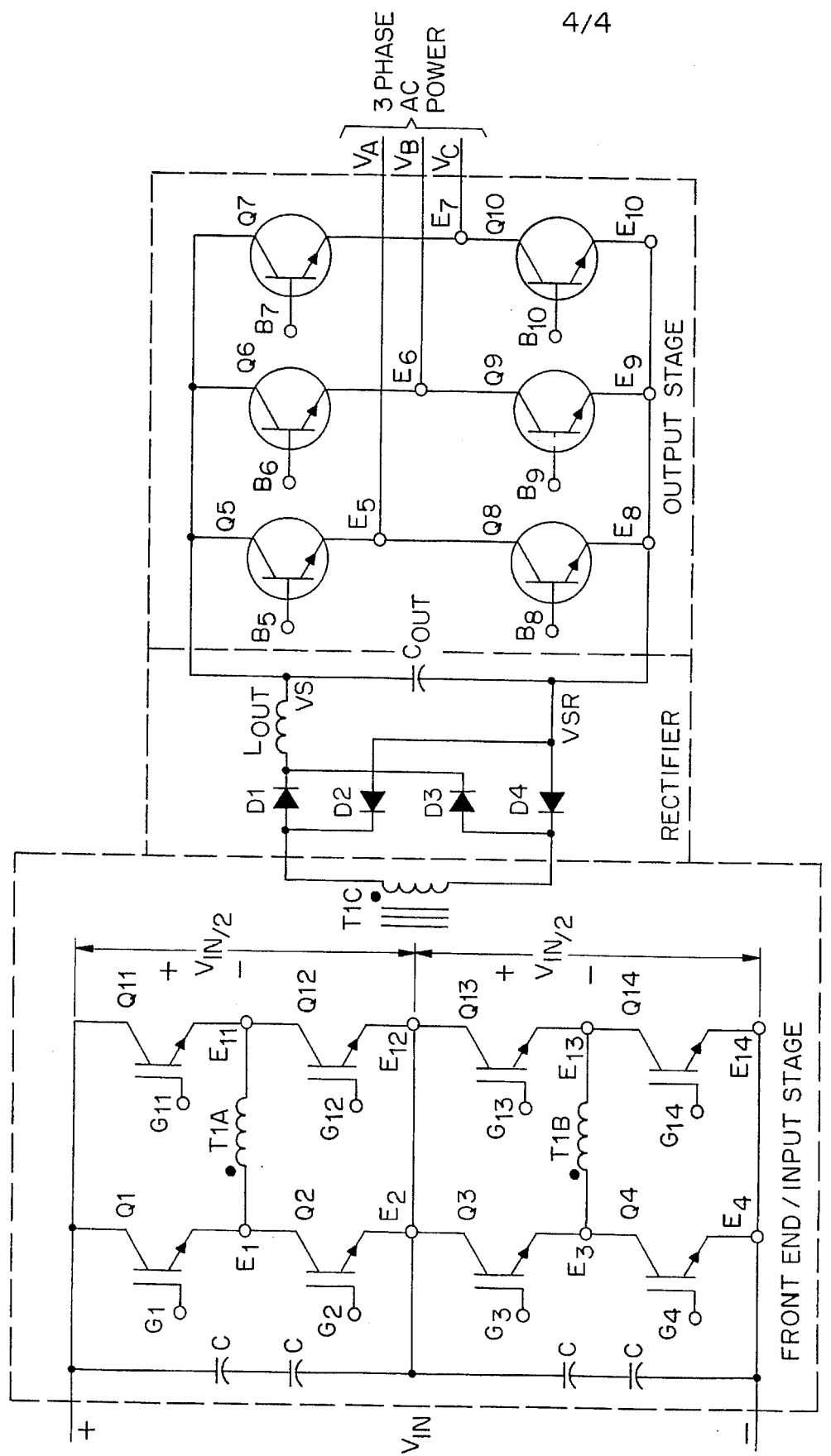
FIG. 4 is a circuit diagram of a preferred fourth embodiment of the invention, representing an inverter comprising full-bridge transistor circuits.

The inverter circuit of FIG. 4 comprises front-end and rectifier stages as described above with reference to FIG. 3, followed by an output stage with transistors Q5 through Q10 as described with reference to FIG. 2. In operation, upon application of a DC input voltage $V_{IN}$, 3-phase AC output is produced. Exemplary numerical values for the components shown in FIG. 4 are as described above for FIG. 2, with capacitors C of 3700 microfarad.

Figure 5:
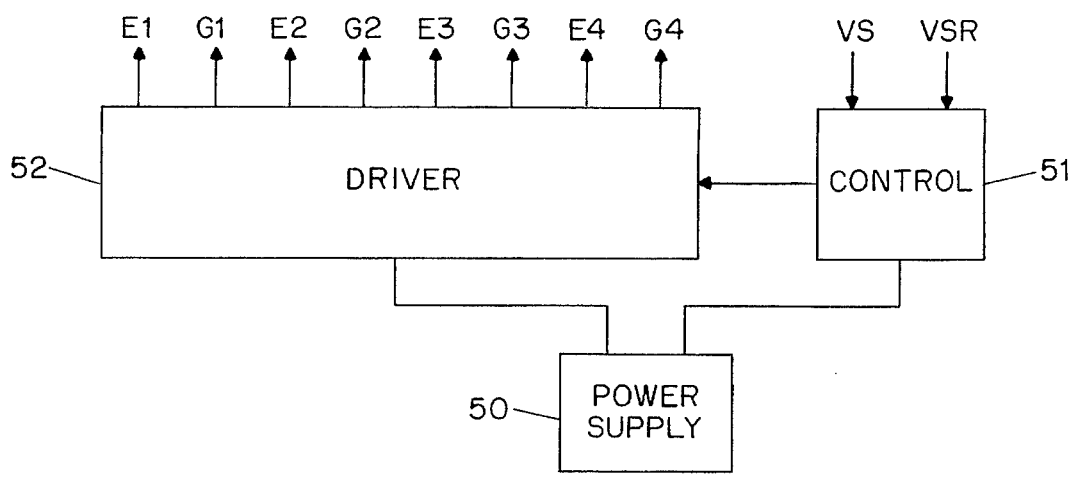
FIG. 5 is a block diagram of exemplary control circuitry for controlling gate and emitter voltages of switching transistors of a power supply circuit in accordance with FIG. 1.

Included in preferred power supplies and inverters is control logic circuitry for the switching transistors. For a power supply circuit as in FIG. 1, FIG. 5 shows a control circuit 51 connected to a driver circuit 52, with logic-isolated power supply 50 at 37 volts, for example. The input terminals VS and VSR of the control circuit 51 are understood, as connected to the correspondingly designated voltage output terminals shown in FIG. 1. The output terminals G1 through G4 and E1 through E4 of the driver circuit 52 are understood as connected to the respective gate and emitter terminals shown in FIG. 1. As connected to the circuit of FIG. 1, the combined control and driver circuits 51 and 52 provide for feedback-controlled modulation of on/off periods of the transistors Q1 through Q4, for maintaining a desired power supply output voltage $V_{OUT}$. Control circuitry as shown in FIG. 5 can be used also for the front end of the inverter circuit shown in FIG. 2. Analogous circuitry can be included for control of the 3-phase AC output stage of the inverter circuit of FIG. 2, with voltage output terminals $V_A$, $V_B$ and $V_C$ of FIG. 2 connected to corresponding control circuitry input terminals, and with driver output terminals connected to the base and emitter terminals B5 through B10 and E5 through E10 of the transistors Q5 through Q10. Control circuitry for power supply and inverter circuits in accordance with FIGS. 3 and 4 is analogous to control circuitry for the circuits in accordance respective with FIGS. 1 and 2.

Characteristically, in accordance with an aspect of embodiments according to FIGS. 1 and 2, the front-end circuit can be interpreted as a hybrid of two half-bridge converters in series. The input voltage $V_{IN}$ is split, with each half-bridge circuit receiving half the input voltage. As a benefit, such a converter can operate with lower-rated, higher-speed switching transistors even when relatively large transients arise at its input terminals. If four transistors are used, as shown in FIGS. 1 and 2, the withstand voltage of the circuit is twice the transistor rated voltage. If eight transistors (in four half-bridge circuits) are connected in series, the withstand voltage for the input is four times the transistor rating. Because of the high operating frequency of this network, the size of filter capacitors and of the switching transformer is reduced.

The operation of a front-end circuit with series-connected half-bridge circuits is similar to that of a single half-bridge circuit, with each half bridge mirroring the operation of the others. Thus, Q1 and Q3 turn on and stay on for the same periods. Their on period (or duty cycle if expressed as a percentage of the fundamental period) is less than or equal to one half of the fundamental period. During the on period, Q1 conducts current through T1A to the capacitor network of C1 and C2. The voltage across T1A is reflected in the secondary winding of the transformer. Similarly, Q3 conducts current through T1B to the capacitor network of C3 and C4, and the voltage across T1B is also reflected in the secondary winding T1C of the transformer. Q2 and Q4 also turn on simultaneously, but 180 degrees out of phase with Q1 and Q3. In this manner, they reverse the current and voltage applied to T1A and T1B, respectively. The voltage induced in the transformer secondary winding T1C is also reversed.

The rectifier network with $L_{OUT}$ and $C_{OUT}$ shown in FIGS. 1 and 2 serves to rectify the AC voltage at the secondary winding of the transformer to produce a DC output. The duty cycle of the switching transistors Q1 through Q4 can be chosen effectively to control the DC output voltage. By reducing the duty cycle, the energy coupled from the primary to the secondary is lowered, effectively reducing the output voltage of the rectifier network. For control of the output voltage level, a control network can be included as described, with feedback of the output voltage for modulation of the duty cycle of the switching transistors. Preferably, in the interest of preventing saturation of the switching transformer, the duty cycles of the switching transistors Q1 and Q3 are closely matched to the duty cycles of Q2 and Q4.

The transformer windings are not restricted to being on one and the same transformer core. T1A and T1B may be on two different cores, or on the same core and wound in parallel. Similarly, T1C may be split into two windings which may be connected in parallel. Such two windings may also be connected in series through two rectifier networks, with the further benefit of allowing the use of faster recovery diodes with lower voltage rating.

Characteristically, in accordance with an aspect of embodiments according to FIGS. 3 and 4, the front-end circuit can be interpreted as a hybrid of two full-bridge converter circuits in series. Analogous to embodiments according to FIGS. 1 and 2, the input voltage $V_{IN}$ is split, with each converter circuit receiving half the input voltage, and the same holds true for any input-voltage transients. In the embodiments of FIGS. 3 and 4, comprising two converter circuits in series, withstand voltage is twice the transistor rated voltage. Analogous to embodiments according to FIGS. 1 and 2, if four such circuits are connected in series, the withstand voltage for the input is four times the transistor rating. Any number, even or odd, of suitable switching circuits can be connected in series for increased input withstand voltage.

In converter operation, Q1, Q3, Q12 and Q14 turn on and off together. Q2, Q4, Q11 and Q13 also turn on an off together, but 180 degrees out of phase with Q1, Q3, Q12 and Q14. Preferably, in the interest of matching of duty cycles, the switching transistors have substantially the same switching characteristics. For control of the output voltage level, a control network can be included as described, with feedback of the output voltage for modulation of the duty cycle of the switching transistors.

We claim:

1. An electrical power converter, comprising:
   an input circuit comprising at least two bridge-topology switching converter circuits connected in series between DC power input voltage means;
   an output circuit for producing a desired AC or DC output voltage, operatively coupled to the input circuit;
   whereby, in electrical power converter operation, input-voltage transients have minimized influence on the output voltage.

2. The electrical power converter of claim 1, wherein the input circuit comprises control circuit means for controlling switching elements of the switching converter circuits.

3. The electrical power converter of claim 2, wherein the control circuit means is operatively coupled for feedback control of the switching elements.

4. The electrical power converter of claim 1, wherein the output circuit is inductively coupled to the input circuit.

5. The electrical power converter of claim 4, wherein the output circuit is inductively coupled to each of the switching converter circuits.

6. The electrical power converter of claim 5, wherein inductive coupling is via a transformer comprising a respective primary winding for each of the switching converter circuits.

7. The electrical power converter of claim 6, wherein each of the primary windings is wound on a separate core.

8. The electrical power converter of claim 6, wherein the primary windings are wound in parallel on one and the same core.

9. The electrical power converter of claim 1, wherein the output circuit comprises a rectifier circuit.

10. The electrical power converter of claim 9, wherein the output circuit further comprises DC-to-AC conversion means operatively coupled to the rectifier circuit for converting rectifier DC output to a desired AC output.

11. The electrical power converter of claim 1, wherein at least one of the switching converter circuits comprises a transistor half-bridge circuit.

12. The electrical power converter of claim 11, wherein both of the switching converter circuits comprise transistor half-bridge circuits, with matched transistor duty cycles.

13. The electrical power converter of claim 1, wherein at least one of the switching converter circuits comprises a transistor full-bridge circuit.

14. The electrical power converter of claim 13, wherein both of the switching converter circuits comprise transistor full-bridge circuits, with matched transistor duty cycles.

15. The electrical power converter of claim 1, wherein at least one of the switching converter circuits comprises an IGBT.

16. The electrical power converter of claim 1, wherein at least one of the switching converter circuits comprises a MOSFET.

17. A DC-to-DC electrical-power supply, comprising:
    an input circuit comprising two DC-to-AC electrical-power bridge-topology switching converter circuits connected in series between DC power input voltage means;
    output circuit means for producing a desired DC output voltage, inductively coupled to each of the switching converter circuits.

18. The DC-to-DC electrical-power supply of claim 17, wherein each of the switching converter circuits comprises a half-bridge circuit.

19. The DC-to-DC electrical-power supply of claim 17, wherein each of the switching converter circuits comprises a full-bridge circuit.

20. A DC-to-AC inverter, comprising:
    an input circuit comprising two electrical-power bridge-topology switching converter circuits connected in series between DC power input voltage means;
    rectifier circuit means for producing a DC intermediary voltage, inductively coupled to each of the switching converter circuits;
    output stage means connected to the rectifier circuit means, for producing a desired AC output voltage from the DC intermediary voltage.

21. The DC-to-AC inverter of claim 20, wherein each of the switching converter circuits comprises a half-bridge circuit.

22. The DC-to-AC inverter of claim 20, wherein each of the switching converter circuits comprises a full-bridge circuit.

* * * * *